US006472881B1

(12) United States Patent
Sugiyama et al.

(10) Patent No.: US 6,472,881 B1
(45) Date of Patent: Oct. 29, 2002

(54) LIQUID METAL ION SOURCE AND METHOD FOR MEASURING FLOW IMPEDANCE OF LIQUID METAL ION SOURCE

(75) Inventors: Yasuhiko Sugiyama, Chiba (JP); Masamichi Oi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/673,941

(22) PCT Filed: Feb. 22, 2000

(86) PCT No.: PCT/JP00/01010

§ 371 (c)(1), (2), (4) Date: Nov. 21, 2000

(87) PCT Pub. No.: WO00/52730

PCT Pub. Date: Sep. 8, 2000

(30) Foreign Application Priority Data

Feb. 26, 1999 (JP) .............................................. 11-51110

(51) Int. Cl.[7] ............................................... G01L 21/34

(52) U.S. Cl. ..................... 324/464; 324/158.1; 324/751

(58) Field of Search .......................... 324/464, 96, 770, 324/349, 345, 356, 158.1, 751; 250/423 F, 423 R, 306, 307, 492.2, 492.21, 396, 397, 398

(56) References Cited

U.S. PATENT DOCUMENTS 5,111,053 A * 5/1992 Suzuki ........................ 50/424

* cited by examiner

*Primary Examiner*—Michael Sherry
*Assistant Examiner*—Tung X. Nguyen
(74) *Attorney, Agent, or Firm*—Adams & Wilks

(57) ABSTRACT

A liquid metal ion source has an emitter electrode for emitting ions, an extraction electrode, proximate the emitter electrode for generating a focused electric field at a tip of the emitter electrode, and a suppression electrode proximate the extraction electrode for adjusting the strength of the focused electric field generated at the tip of the emitter electrode so that metal ions are extracted from liquid metal covering the tip of the emitter electrode at a desired emission current value. A storage device stores a function defining a relationship between variation (ΔIe) in current of the emitter electrode and variation (ΔVsup) in voltage of the suppression electrode as a function ΔIe=F(ΔVsup), with the voltage (Vext) of the extraction electrode being at a fixed value. A control apparatus controls voltages of the extraction and suppression electrodes and the emission current, detects the variation ΔVsup in the voltage (Vsup) of the suppression electrode when a voltage (Vext) of the extraction electrode is made to vary by only ΔVext with the current of the emitter electrode being held to a fixed value, and calculates flow impedance ΔVext/ΔIe using the voltage variation amounts ΔVext and ΔVsup and the function acquired form the storage device.

11 Claims, 1 Drawing Sheet

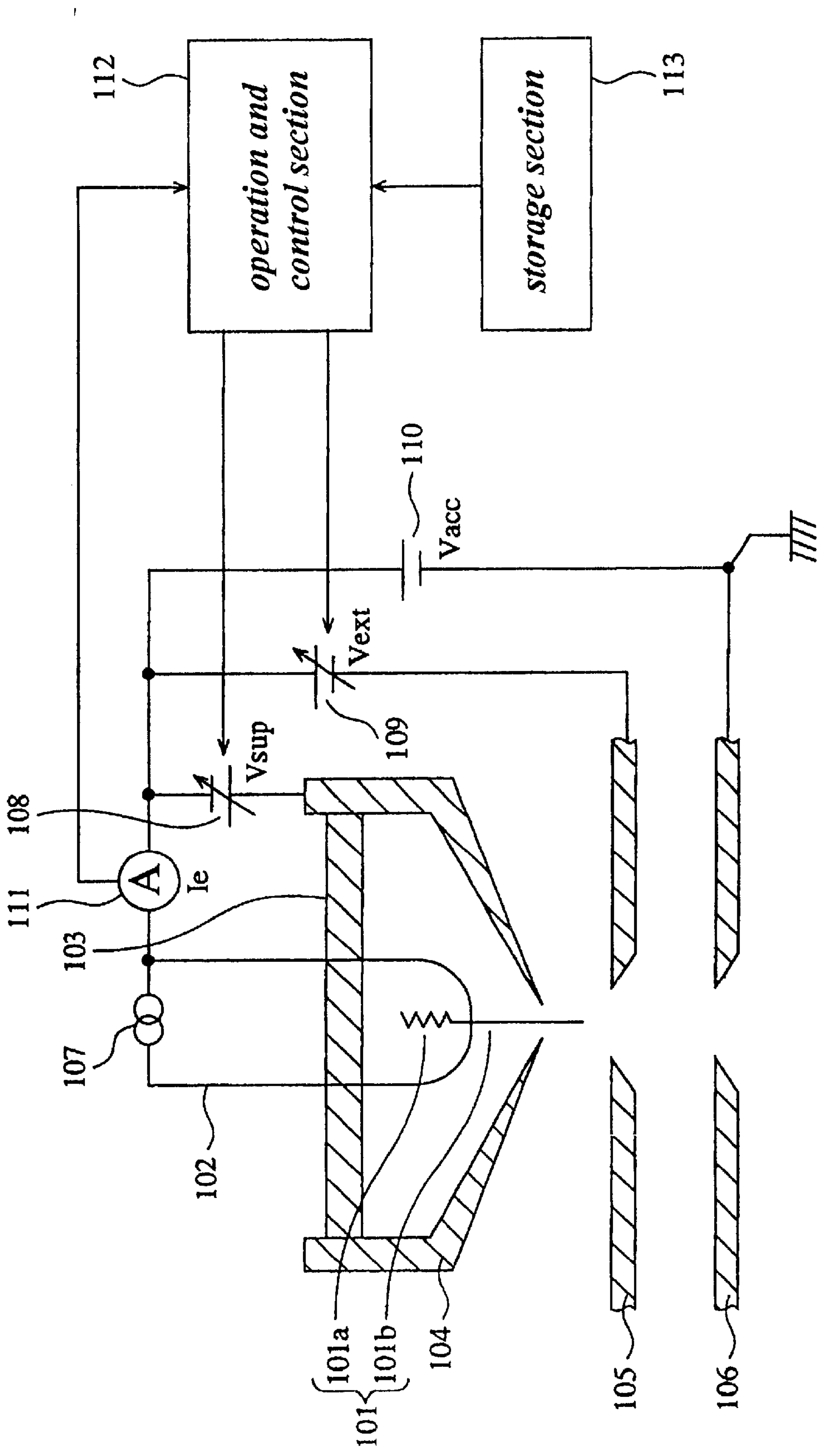
112
operation and control section
storage section
113
110
Vacc
Vext
109
Vsup
108
111
A
Ie
103
107
102
101a
101b
101
104
105
106

LIQUID METAL ION SOURCE AND METHOD FOR MEASURING FLOW IMPEDANCE OF LIQUID METAL ION SOURCE

BACKGROUND OF THE INVENTION

1. Technical Field

The present invention relates to a liquid metal ion source used, for example, in a focused ion beam system or the like, and more specifically to a liquid metal ion source provided with a function for detecting flow impedance.

2. Related Art

Conventionally, devices causing ejection of ions from a metal in a molten state are known, and utilize what is called a liquid metal ion source (or LMIS). The liquid metal ion source is used, for example, as an ion source for a focused ion beam (FIB) system. A focused ion beam system focuses metal ions using an ion-optical system, and irradiates a sample with ions. A focused ion beam system can be used, for example, in scanning ion microscope (SIM) observations, and can also perform deposition or etching of a thin film of any shape without using a mask.

With a liquid metal ion source, the liquid metal is made to stick to the surface of a pointed emitter electrode, and metal ions are drawn out by causing a convergence field at the tip of this emitter electrode. An extractor electrode and a suppressor electrode are used to generate the convergence field. A D.C. value of the metal ions ejected from the emitter electrode is called the emission current.

With the liquid metal ion source, use is suspended if flow impedance exceeds a control value, and processing is preferably carried out to return to a normal operating state. A main cause of fluctuation in flow impedance is increase in impurities or dirt being attached to the tip part of the emitter electrode. For this reason, in the event that the liquid metal ion source is used over a prolonged period of time it is preferable that the flow impedance is measured every certain time.

A flow impedance Z is represented by the following equation (1) if an amount of variation in an extraction voltage Vext is ΔVext and an amount of variation in an emission current Ie is ΔIe:

$$Z=\Delta vext/\Delta Ie \quad (1)$$

In the related art, the extraction voltage Vext changes by only ΔVext with a voltage Vsup of a suppression electrode in a steady state, and flow impedance is calculated by measuring variation amount ΔIe of the emission current Ie at this time.

However, in the related art, flow impedance is measured by causing variation in the emission current Ie, which means that it is not possible to measure the flow impedance while the liquid metal ion source is being used, and use must be suspended.

If the emission current Ie is caused to vary while carrying out thin film deposition or etching processing etc., the deposition rate or the etching rate will vary, making it impossible to carry out high precision film thickness control.

The inventors of this application have also invented a liquid metal ion source that keeps emission current Ie constant by controlling the voltage of a suppression electrode (in a separate application), but with the liquid metal ion source of that application it is necessary to switch to a control mode so that the voltage of the suppression electrode becomes constant when flow impedance measurement is carried out. As a result, it is necessary to interrupt usage, and the length of time required to measure flow impedance is increased by the time needed to switch to suppression mode.

On order to solve the above described problems in the related art, an object of the present invention is to provide a liquid metal ion source that can enable measurement of flow impedance in a reduced time without the need to interrupt use.

DISCLOSURE OF THE INVENTION (1) A liquid metal ion source of the present invention uses an extraction electrode and a suppression electrode to extract metal ions from liquid metal attached to a tip of an emitter electrode by causing a focused electric field to be generated at the tip of the emitter electrode.

There are provided storage means for storing a function of an amount of variation in emission current and an amount of variation ΔVsup in the voltage of the suppression electrode as a function ΔIe=f(ΔVsup), with the voltage Vext on the extraction electrode fixed, detection means for detecting an amount of variation ΔVsup in the voltage Vsup on the suppression electrode when the voltage Vext of the extraction electrode is made to vary by only ΔVext with the current of the emitter electrode fixed, and calculation means for calculating flow impedance ΔVext/ΔIe using the voltage variation amounts ΔVext and ΔVsup acquired by the detection means and the function acquired from the storage means.

With a liquid metal ion source constructed in this manner, since it is possible to detect flow impedance without causing variation in a current value Ie of the emitter electrode, it is possible to perform this detection operation in parallel with normal operations (microscopic observation, thin film deposition or etching).

(2) A flow impedance measuring method for a liquid metal ion source of the present invention is a method of measuring the flow impedance of a liquid metal ion source, using an extraction electrode and a suppression electrode, for extracting metal ions from liquid metal attached to the tip of an emitter electrode, by causing a focused electric field at the tip of the emitter electrode.

There is provided a storage process for inputting and storing a function of an amount of variation in emission current and an amount of variation ΔVsup in the voltage of the suppression electrode as a function ΔIe=f(ΔVsup), with the voltage Vext on the extraction electrode fixed, a detection process for detecting an amount of variation ΔVsup in the voltage Vsup on the suppression electrode when the voltage Vext of the extraction electrode is made to vary by only ΔVext with the current of the emitter electrode fixed, and a calculation process for calculating flow impedance ΔVext/ΔIe using the voltage variation amounts ΔVext and ΔVsup acquired from detection means and the function acquired from storage means.

With such a flow impedance measuring method, since it is possible to detect flow impedance without causing variation in the current value Ie of the emitter electrode, it is possible to perform this detection operation in parallel with normal operations (microscopic observation, thin film deposition or etching).

BRIEF DESCRIPTION OF THE DRAWING

The single FIGURE is a conceptual drawing showing the structure of a desirable liquid metal ion source according to the invention.

DESCRIPTION OF PREFERRED EMBODIMENTS

Embodiments of this invention will now be described in the following, using the attached drawing. In the drawing, the size, shape and positional relationship of each structural component is shown schematically so as to facilitate understanding of the invention as much as possible, and the numerical conditions are not limited to the examples shown in the following.

The FIGURE is a conceptual drawing showing the structure of a liquid metal ion source of this embodiment.

In the FIGURE, a needle 101 is provided with a coil shaped accumulating section 101*a* and a pointed emitter electrode 101*b*. The accumulating section 101*a* is used in order to hold a liquid metal, namely, a molten ion material (not shown in the drawings). A liquid metal film is formed on the surface of the emitter electrode lolb by liquid metal held on the accumulating section 101*a* flowing off. By generating a focused electric field at the tip of the emitter electrode 101*b*, metal ions are extracted from the liquid metal film on the tip. The needle 101 can be formed of tungsten, for example. It is also possible to use gallium, for example, as the ion material.

A filament 102 heats the needle 101. In this way, it is possible to maintain an ion material of gallium or the like in a molten state. The film thickness of a liquid metal film formed on the surface of the emitter electrode is varied depending on the temperature of the filament 102.

A base 103 holds the filament 102 and a suppression electrode 104 that will be described later. This base 103 is formed, for example, of an insulating material such as glass. The suppression electrode 104 is arranged underneath the needle 101. The strength of a focused electric field generated at the tip of the emitter electrode 101*b* is adjusted by applying a low positive or negative voltage Vsup to the suppression electrode, and in this way the emission current Ie is fixed to a specified value.

An extraction electrode 105 is arranged below the suppression electrode 104. It is possible to cause an extremely high focused electric field to be generated at the tip of the emitter electrode 101*b* provided on the needle 101 by applying a voltage Vext of a few tens of kilovolts to the extraction electrode 105. Metal ions are extracted from the liquid metal by this focused electric field.

A cathode 106 is arranged underneath the extraction electrode 105. Metal ions extracted from the tip of the emitter electrode 101*b* are accelerated by an electric field between this cathode 106 and the emitter electrode 101*b*, to form an ion beam.

A current source 107 has one terminal connected to one terminal of the filament 102 and another terminal connected to the other end of the filament 102 and to a positive terminal of a voltage source 110. Heating current is supplied to the filament 102 by this current source 107.

A voltage source 108 has a positive terminal connected to the suppression electrode 104, and a negative terminal connected to a positive terminal of the voltage source 110. A suppression voltage Vsup is applied to the suppression electrode 104 by this voltage source 108.

A voltage source 109 has a negative terminal connected to the extraction electrode 105 and a positive terminal connected to the positive terminal of the voltage source 110. The extraction voltage Vext is applied to the extraction electrode 105 by this voltage source 109.

The negative terminal of the voltage source 110 is connected to the cathode 106, and to ground. A potential difference Vacc is generated across the cathode 106 and the emitter electrode 101*b* by this voltage source 110.

An ammeter 111 is used to measure emission current Ie.

An operation and control section 112 performs current control of the current source 107 and voltage control of the voltage sources 108–110, and also detects flow impedance using emission current Ie measured by the ammeter 111 and a function stored in the storage section 113.

The storage section 113 stores a function represented by equation (2) below. Here, this function (2) is obtained by causing fluctuation in an amount of current variation ΔIe of the emitter electrode 101*b* with the voltage Vext of the extraction electrode 105 fixed, and measuring an amount of voltage variation ΔVsup on the suppression electrode at this time. This function (2) is measured before use of the liquid metal ion source and stored in the storage section 113.

$$\Delta Ie=f(\Delta Vsup) \tag{2}$$

Function (2) is preferably re-measured as required and rewritten into the storage means 113, as it changes according to manufacturing variations and operating conditions of the liquid metal ion source.

Next, a method of measuring the low impedance of the liquid metal ion source shown in the FIGURE will be described.

First of all, before commencing use of the liquid metal ion source, the above described function (2) is measured and stored in the storage section 113.

In a normal procedure the liquid metal ions source is made to operate, and a normal operation (microscopic observation, thin film deposition, or etching) is started.

During operation of the liquid metal ion source, the operation and control section 112 controls the voltage source 109 to maintain the extraction voltage Vext at a constant value. The suppression voltage Vsup is also suitably varied so that the current value Ie of the ammeter 111 is maintained at a fixed value.

If the operating time of the liquid metal ion source reaches a predetermined time (for example 10 hours), the operation and control section 112 measures the flow impedance in parallel with the normal operation, as described below.

The operation and control section 112 first of all causes gradual variation in the extraction voltage Vext. In parallel with this, the operation and control section 112 causes variation in the suppression voltage Vsup so that the current value Ie of the ammeter 111 is kept at the above described constant value. Then, when the amount of variation in the extraction voltage Vext has reached a predetermined value ΔVext, the amount of variation ΔVsup in the suppression voltage Vsup at that time is detected.

Next, the operation and control section 112 reads out the function (2) from the storage section 113. Flow impedance ΔVext/ΔIe is then calculated using this function 2 and the voltage variation amounts ΔVext and ΔVsup. That is, after ΔIe has been calculated by substituting ΔVsup into function (2), the flow impedance Z is calculated by substituting this ΔIe and ΔVext into equation (1).

Then, if the flow impedance is larger than a control value, the normal operation is suspended and processing for returning to normal operating conditions is carried out. As this processing, it is possible; for example, to carry out heating or what is known as flushing. Heating is an operation to remove a surface oxidation film on the emitter electrode 101*b* by increasing current of the filament 102 to raise the temperature of the needle 101 (in the case where the ion source is gallium, to between 750–800° C.). Flushing is an operation for removing impurities attached to the surface of the emitter electrode 101*b* by raising the extraction voltage Vext to increase the emission current Ie (for example, to 100 μA or more). If the flow impedance Z is larger than the control value, it is possible to prolong the lifespan of the liquid metal ion source by carrying out these operations.

On the other hand, if the flow impedance is less than equal to the control value, the normal operation continues, and flow impedance is re-measured when the operation time of the liquid ion source reaches the specified time again.

With this embodiment, measurement of flow impedance is only carried out after the lapse of the specified time after commencing operation of the liquid metal ion source, but it is also possible to measure the flow impedance at the time of starting operation of the liquid metal ion source, and further, it is possible to measure the flow impedance when an operator deems it necessary, even if the operating time has not reached the specified time.

In this way, with this embodiment, it is possible to measure the flow impedance without causing variation in the emission current Ie, which means that it is possible to carry out the measurement operation in parallel with a normal operation (microscopic observation, thin film deposition or etching). That is, there is no need to suspend the normal operation when measuring the flow impedance, and it is only necessary to suspend the normal operation and carry out processing to return to normal operating conditions in the event that the measurement results exceed a control value.

At the time of measuring the flow impedance, since the emission current Ie is controlled to a constant value by causing variation in the suppression voltage Vsup in accordance with fluctuation in the extraction voltage Vext, there is a possibility that this emission current Ie will fluctuate slightly. However, this fluctuation value is extremely small, and it is very easy to keep it within a permissible range for observation or manufacture compared to the case of a liquid metal ion source of the related art.

With the liquid metal ion source of this embodiment, a system of keeping the emission current at a constant level by causing variation in the suppression voltage at the time of a normal operation has been adopted. If this embodiment is applied to a liquid metal ion source in this type of system, the control method for the suppression voltage Vsup is exactly the same for both the normal operation and the measurement operation, which means that there is no need to switch a control mode for the suppression voltage when performing the measurement operation. Accordingly, it is possible to reduce the time required for the measurement operation.

This embodiment is particularly effective in cases where an operation requiring precise processing over a long period of time is carried out, such as where a sample for use in transmission microscopy is automatically formed.

Industrial Applicability

As has been described in detail above, according to this invention, it is possible to provide a liquid metal ion source that enables measurement of flow impedance in a reduced time without suspending use.

What is claimed is:

1. In a liquid metal ion source having an extraction electrode and a suppression electrode for extracting metal ions from a liquid metal coating on a tip of an emitter electrode by causing a focused electric field to be generated at the tip of the emitter electrode:

storage means for storing a function defining a relationship between an amount of variation (ΔIe) in current of the emitter electrode and variation (ΔVsup) in a voltage of the suppression electrode as a function ΔIe=F (ΔVsup), with the voltage Vext of the extraction electrode being at a fixed value;

detection means for detecting the variation ΔVsup in the voltage (Vsup) of the suppress ion electrode when a voltage Vext of the extraction electrode is made to vary by only ΔVext with the current of the emitter electrode being fixed; and calculation means for calculating flow impedance ΔVext/ΔIe using the voltage variation amounts ΔVext and ΔVsup acquired by the detection means and the function acquired from the storage means.

2. The liquid metal ion source of claim 1; further comprising means for periodically determining and storing the function in the storage means.

3. A focused ion beam apparatus having the liquid metal ion source of claim 1 or claim 2; wherein the detection means includes means for performing a detection operation in parallel with microscopic observation, thin film deposition or etching using the focused ion beam apparatus.

4. A flow impedance measuring method for a liquid metal ion source, using an extraction electrode and a suppression electrode, for extracting metal ions from a liquid metal coating on a tip of an emitter electrode by generating a focused electric field at the tip of the emitter electrode, the method comprising:

a storage process for inputting and storing a function defining a relationship between an amount of variation (ΔIe) in current of the emitter electrode and an amount of variation (ΔVsup) in the voltage of the suppression electrode as a function ΔIe=f(ΔVsup), with the voltage (Vext) of the extraction electrode being fixed;

a detection process for detecting an amount of variation ΔVsup in the voltage (Vsup) of the suppression electrode when the voltage Vext of the extraction electrode is made to vary by only ΔVext with the current of the emitter electrode being fixed; and a calculation process for calculating flow impedance ΔVext/ΔIe using the voltage variation amounts ΔVext and ΔVsup acquired through the detection process and the function acquired through the storage process.

5. The flow impedance measuring method for the liquid metal ion source of claim 4; wherein the storage, calculation and detection processes are performed periodically to periodically rewrite the stored function.

6. The flow impedance measuring method for a liquid metal ion source of claim 4 or claim 5; wherein the storage process is carried out in parallel with microscopic observation, thin film depositing or etching using the metal ions.

7. A focused ion beam apparatus having the liquid metal ion source of claim 1 or claim 2; wherein the calculation means includes means for performing a calculation operation in parallel with microscopic observation, thin film deposition or etching using the focused ion beam apparatus.

8. The flow impedance measuring method for a liquid metal ion source of claim 4 or claim 5, wherein the detection process is carried out in parallel with microscopic observation, thin film depositing or etching using the metal ions.

9. A liquid metal ion source comprising: an emitter electrode for emitting ions; an extraction electrode arranged proximate the emitter electrode for generating a focused electric field at a tip of the emitter electrode; a suppression electrode arranged proximate the extraction electrode for adjusting the strength of the focused electric field generated at the tip of the emitter electrode so that metal ions are extracted from liquid metal covering the tip of the emitter electrode at a desired emission current value; a storage device for storing a function defining a relationship between variation (ΔIe) in current of the emitter electrode and variation (ΔVsup) in a voltage of the suppression electrode as a function ΔIe=F(ΔVsup), with the voltage (Vext) of the extraction electrode being at a fixed value; and a control apparatus for controlling voltages of the extraction and suppression electrodes and the emission current, detecting the variation ΔVsup in the voltage (Vsup) of the suppression electrode when a voltage (Vext) of the extraction electrode is made to vary by only ΔVext with the current of the emitter electrode being held to a fixed value, and calculating flow impedance ΔVext/ΔIe using the voltage variation amounts ΔVext and ΔVsup and the function acquired from the storage device.

10. A liquid metal ion source according to claim 9; wherein the control apparatus periodically determines and stores the function.

11. A focused ion beam apparatus having the liquid metal ion source of claim 9; wherein the control apparatus performs at least one of the detection operation or the calculation operation in parallel with microscopic observation, thin film deposition or etching using the focused ion beam apparatus.

* * * * *